United States Patent [19]
Vonholm et al.

[11] Patent Number: 6,082,525
[45] Date of Patent: Jul. 4, 2000

[54] APPLICATION OF REMOVABLE INFORMATION/ADVERTISING INDICIA

[75] Inventors: Christian Vonholm, Billingstad; Stian Valentin Knutsen, Nesbru, both of Norway

[73] Assignee: Balder Promotion AS, Oslo, Norway

[21] Appl. No.: 09/269,232

[22] PCT Filed: Oct. 1, 1997

[86] PCT No.: PCT/NO97/00266

§ 371 Date: Mar. 23, 1999

§ 102(e) Date: Mar. 23, 1999

[87] PCT Pub. No.: WO98/14930

PCT Pub. Date: Apr. 9, 1998

[30] Foreign Application Priority Data

Oct. 2, 1996 [NO] Norway ................................ 964179

[51] Int. Cl.[7] ................................................. B65G 43/00
[52] U.S. Cl. ............................................................. 198/502.1
[58] Field of Search ................................. 198/502.1, 337

[56] References Cited

U.S. PATENT DOCUMENTS

| | | | |
|---|---|---|---|
| 4,979,591 | 12/1990 | Habegger et al. | 198/502.1 X |
| 5,244,080 | 9/1993 | Bierbaum | 198/502.1 |
| 5,280,831 | 1/1994 | Conklin, Jr. | 198/502.1 |
| 5,358,094 | 10/1994 | Molinaro et al. | 198/502.1 |

FOREIGN PATENT DOCUMENTS

| | | | |
|---|---|---|---|
| 2750226 | 5/1978 | Germany | 198/337 |
| WO 96/27180 | 9/1996 | WIPO . | |

*Primary Examiner*—James R. Bidwell
*Attorney, Agent, or Firm*—Young & Thompson

[57] ABSTRACT

A method for application of information/advertising in the form of foil/stickers on a conveyor belt in cashier counters in grocery stores, at airports, etc., includes the application of heat/pressure by a press which presses down parts of the conveyor belt, thus forming recesses in the conveyor belt, and in these recesses there are placed removable foil/stickers.

4 Claims, 4 Drawing Sheets

APPLICATION OF REMOVABLE INFORMATION/ADVERTISING INDICIA

BACKGROUND OF THE INVENTION

The present invention relates to a method for applying information/advertising in the form of foil/stickers to a conveyor belt. The conveyor belt can be employed in cashier counters in grocery shops, at airports, etc.

In U.S Pat. No. 4,979,591 there is disclosed a conveyor belt for a cashier counter, wherein information/advertising indicia have been applied to the conveyor belt. A special print is transferred by transfer printing to the outer surface of the belt by the application of colour and adhesive from an underlying paper at a temperature of 120–160° C. and a pressure of 2–6 bar during a pressure period of 10–60 seconds. In this case, therefore, a protective film must be employed if the product is to be effective.

In the applicant's Norwegian patent application no. 950791 there is disclosed a method for applying information/advertising indicia to a cashier counter's conveyor belt. In this application a better quality of information/advertising is provided by the use of a special print type which permits detailed motifs, combined with a printing technique where the print is melted into the conveyor belt, thus becoming an integrated part of it and consequently cannot be torn or worn off, which results in a quality print which is expected to have a lifetime of up to 2 years.

SUMMARY OF THE INVENTION

The present invention is a further development of the applicant's Norwegian patent application no. 950791. As indicated in the following drawing description, the special foil/stickers can be employed on conveyor belts by means of appropriate means such as by means of a heat/pressure press which presses down parts of the conveyor belt, thus forming recesses in the conveyor belt and that removable foil/stickers are inserted into these recesses. The recesses in the belt may be up to 0.5 mm deep, and the foil/stickers may be thinner than or equal to 0.5 mm. This prevents the foil from being torn off when the belt goes round the rollers on, e.g., a cashier counter due to the fact that the foil does not exceed the conveyor belt's own thickness. The foil/stickers may be applied for a campaign and removed when it is over without destroying or reducing the quality of the conveyor belt. However, the foil/stickers are securely fixed during the campaign period. The recesses in the conveyor belt can be cleaned and coated with a chemical agent to ensure that the removable foil/stickers are securely fixed to the conveyor belt. A suitable agent may be an alcohol, such as isopropanol, which forms chemical bonds and alters the structure of the surface of the conveyor belt.

For its part the conveyor belt consists of 4 layers, with a PVC layer on top, then a sheet, a new PVC layer and finally a sheet, as illustrated in FIG. 2.

BRIEF DESCRIPTION OF THE DRAWINGS

The invention will be described in more detail in the following description of the invention with reference to the drawing, in which.

DESCRIPTION OF THE PREFERRED EMBODIMENTS

Figure 1:
FIG. 1 illustrates information/advertising in the form of a foil/sticker.
Figure 2:
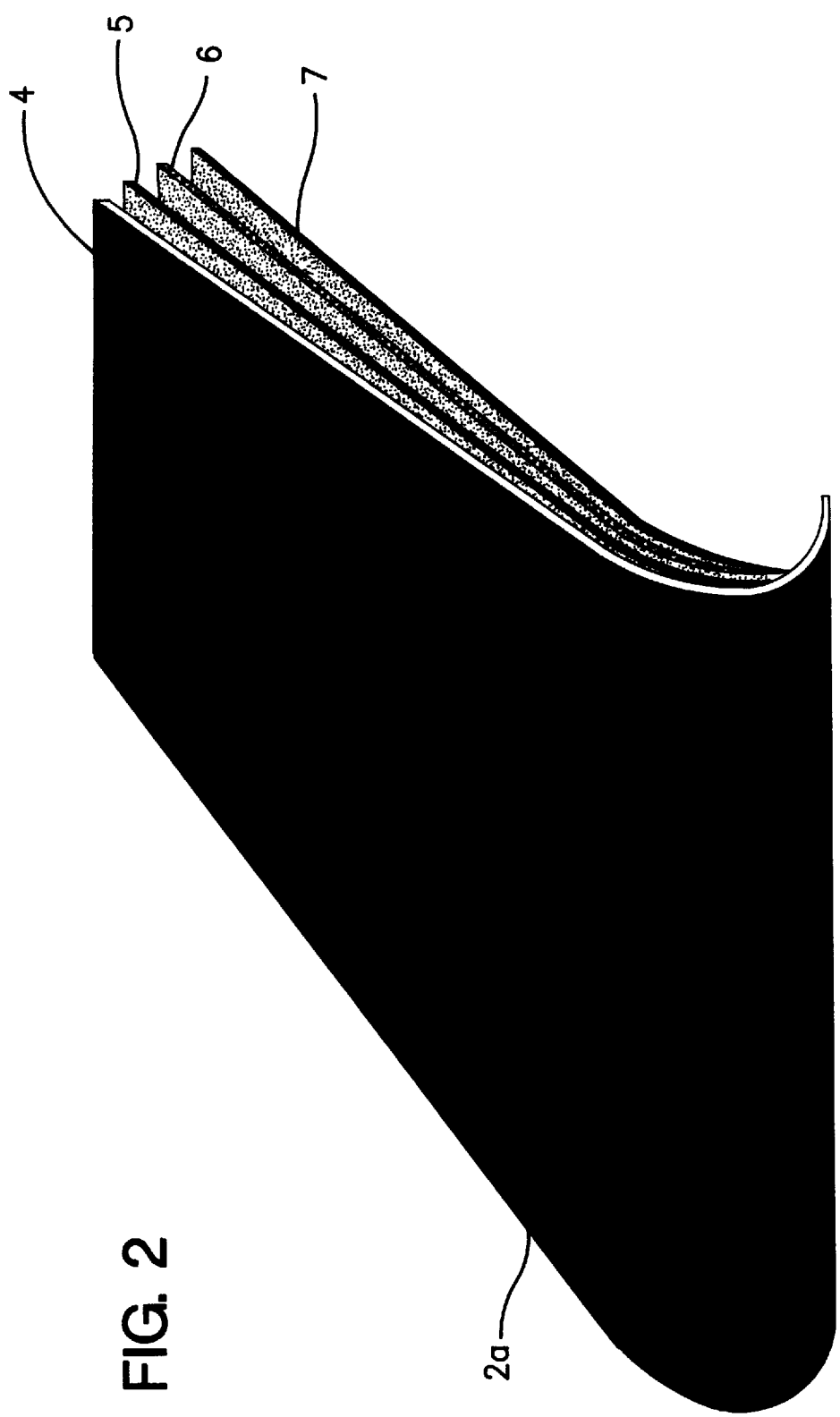
FIG. 2 illustrates the construction of the conveyor belt.
Figure 3:
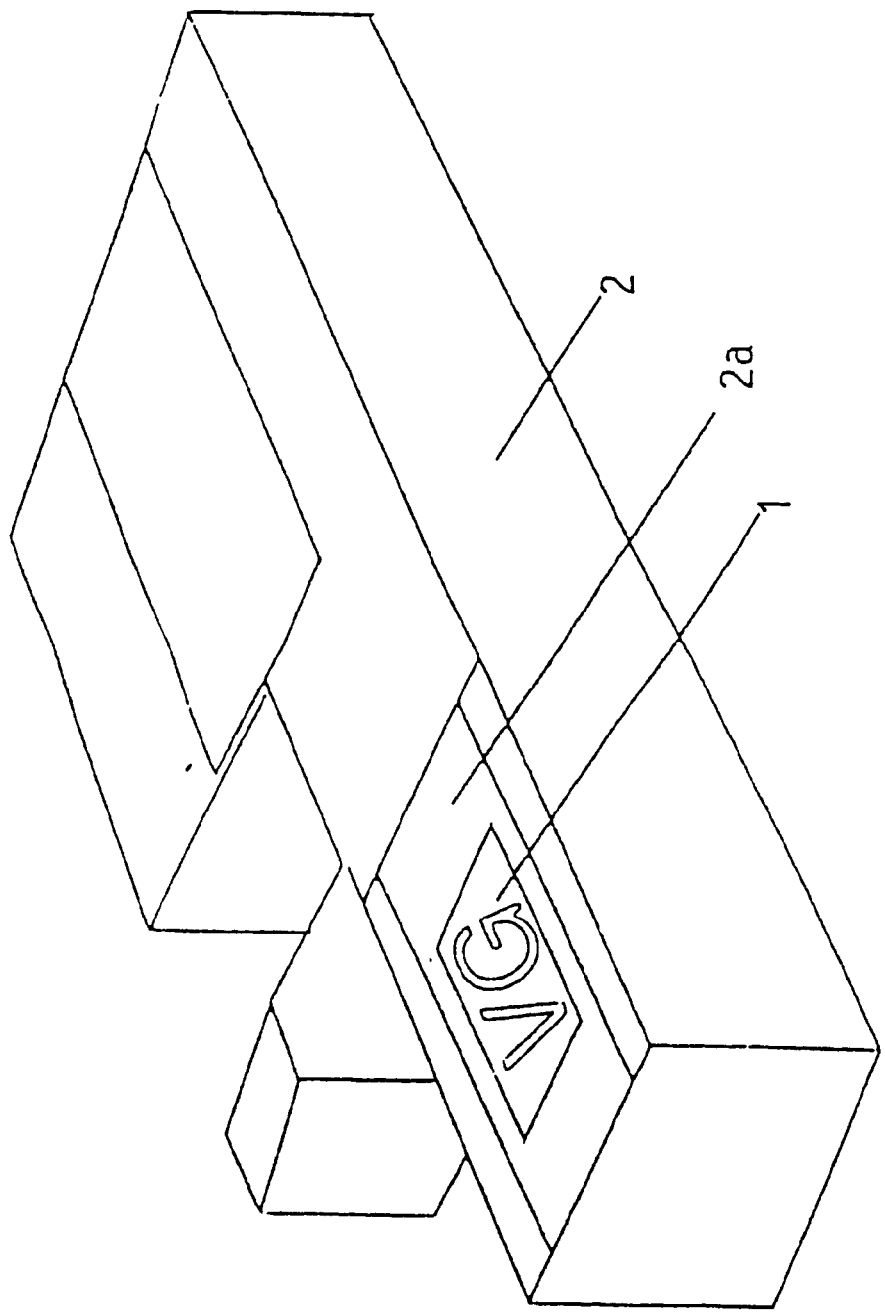
FIG. 3 illustrates a conveyor belt with information/advertising applied, mounted in a cashier counter.
Figure 4:
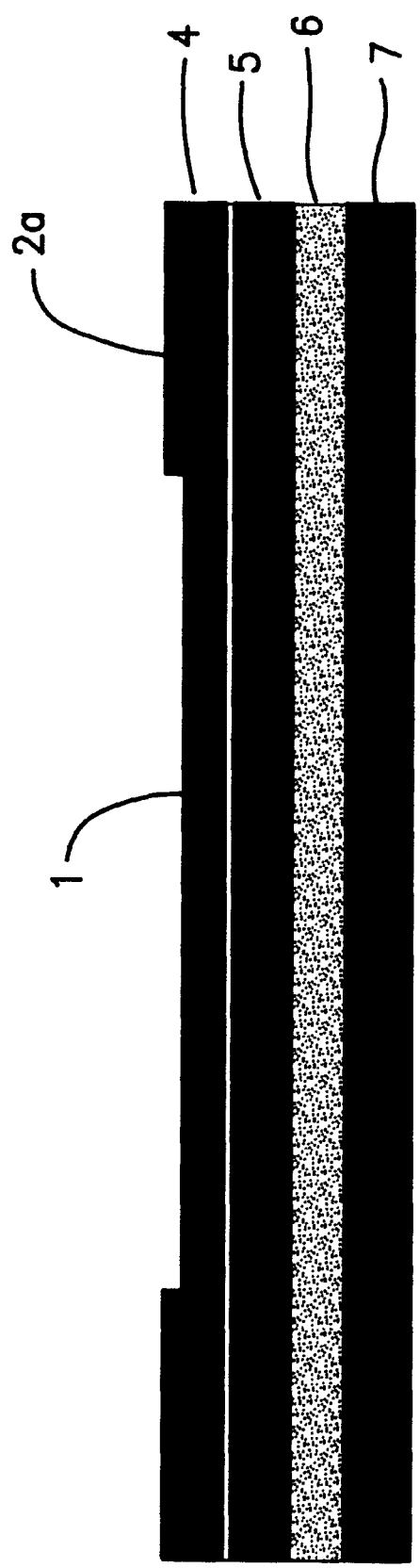
FIG. 4 is a lateral section of a conveyor belt with recesses where the foil/sticker is inserted in these recesses, mounted in a cashier counter.

Thus FIG. 1 is a perspective view of information/advertising in the form of a foil/sticker 1. FIG. 2 is a perspective view of a conveyor belt 2a, together with its construction where the top layer is PVC 4, the next layer is a sheet 5, followed by a new PVC layer 6 and finally a sheet 7. FIG. 3 illustrates how a conveyor belt 2a looks mounted in a cashier counter 2 after information/advertising has been applied. FIG. 4 shows in a lateral view how a conveyor belt 2a looks mounted in a cashier counter 2 after information/advertising has been applied in the form of foil/stickers 1 in recesses in the conveyor belt, where these recesses have been formed by means of a heat/pressure press. The conveyor belt 2a which thereby acts as a display surface for foil/stickers 1 may thereby contain clear information for the customer, e.g. as to whether payment is accepted at this cash point in the form of credit cards, or the customer/staff can be reminded that it is illegal to buy/sell, e.g., beer/tobacco to minors, while at the same time the opportunity is offered to apply a desired advertising message to the conveyor belt 2a during the campaign period.

When applied, the method for providing information/advertising on a conveyor belt according to the invention will provide the customers of, e.g., grocery shops with good, clear information on which products and services are being offered/provided through the shop during the campaign period, while at the same time providing the suppliers of goods and services with the opportunity of informing the customers of the existence of their products and services etc. While waiting to pay, the customer will have the opportunity to read the advertisement or the message which is displayed on the viewing surface. Moreover, the shape and size of the conveyor belt and recesses are dependent on the purpose. When applied at airports for transporting people over great distances, the shape and size of the conveyor belt and recesses for foil/stickers may necessarily be different to those used for cashier counters in grocery stores.

Reasonable variations and modifications can be performed in the combination and the arrangement in the method which is indicated in the description and illustrated in the drawings without deviating from the scope of the invention.

What is claimed is:

1. A method for applying information/advertising in the form of foil/stickers to a conveyor belt in cashier counters in grocery stores, at airports, etc., characterized in that a heat/pressure press is employed which presses down parts of the conveyor belt, thus forming recesses in the conveyor belt, whereupon removable foil/stickers are inserted in the recesses.

2. A method according to claim 1, characterized in that the surface of the foil/sticker used does not have upwardly projecting edges which rise above the conveyor belt's own surface/height and thereby cannot be torn off.

3. A method according to claim 1, characterized in that foil/stickers become an integrated part of the conveyor belt's surface and/or material when they are applied.

4. A method according to claim 2, characterized in that foil/stickers become an integrated part of the conveyor belt's surface and/or material when they are applied.

* * * * *